July 12, 1949.　　　H. J. LIVERNOIS　　　2,475,971
TRAILER STRUCTURE
Filed Oct. 21, 1946　　　　　　　　　　2 Sheets-Sheet 1
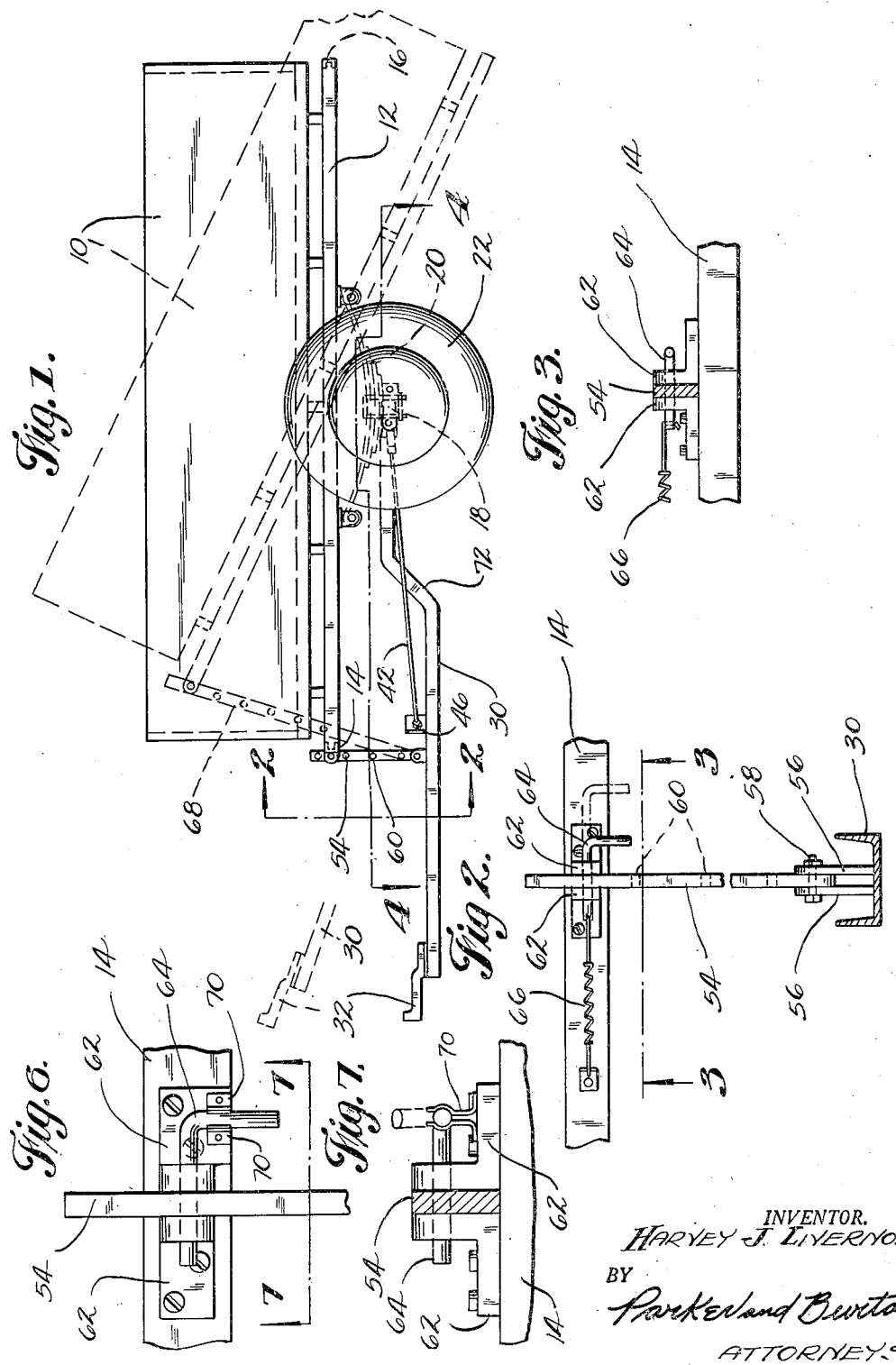
INVENTOR.
HARVEY J. LIVERNOIS
BY
Parker and Burton
ATTORNEYS.

July 12, 1949.  H. J. LIVERNOIS  2,475,971
TRAILER STRUCTURE
Filed Oct. 21, 1946  2 Sheets-Sheet 2
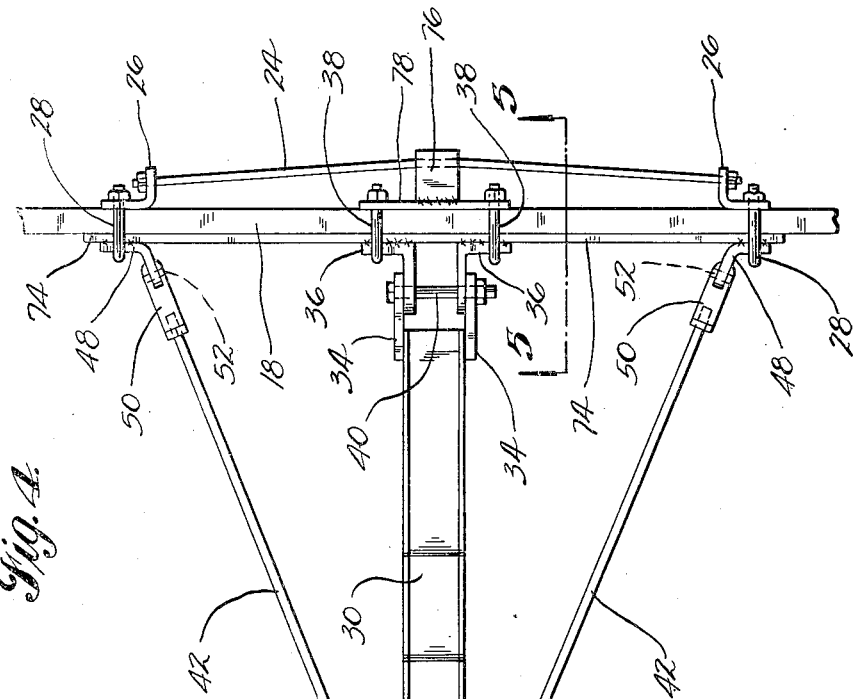
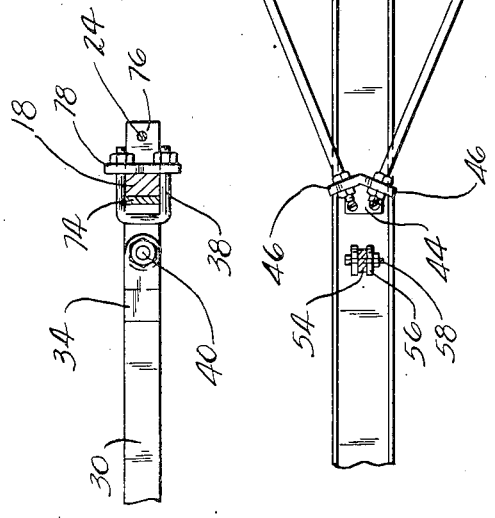
INVENTOR.
HARVEY J LIVERNOIS
BY
Parker and Burton
ATTORNEYS.

Patented July 12, 1949

2,475,971

UNITED STATES PATENT OFFICE 2,475,971

TRAILER STRUCTURE

Harvey J. Livernois, Romulus, Mich.

Application October 21, 1946, Serial No. 704,652

2 Claims. (Cl. 280—33.4)

1

This invention relates to trailers and particularly to improvements in two-wheeled trailers attachable to motor vehicles and the like for hauling various types of loads.

An important object of this invention is to provide an improved two-wheeled trailer having novel means for adjusting the inclination of the load-carrying body relative to the towing connection and the ground. Another object of this invention is to provide an improved lightweight trailer capable of hauling heavy loads at high speeds in a safe and efficient manner. A further object of this invention is to provide an improved trailer structure which can be manufactured and assembled at low cost and which is easily and quickly adjustable to accommodate various types of loads and to level the load-carrying body regardless of the angle of inclination of the towing connection.

In carrying out the invention, the towing frame, which is in the form of an elongated reach or draw bar, is directly attached by a novel pivotal connection to the single load-carrying axle and is swingable relative thereto. Associated with the reach or draw bar are radius rods which are likewise directly pivotally connected to the axle and are swingable with the draw bar as the latter is adjusted to various inclined positions. The forward end of the reach or draw bar is shaped for coupling to the rear end of a motor vehicle. Intermediate the length of the draw bar, a bend is provided which predisposes the forward section of the draw bar below the level of the rear section thereof and by so increasing the clearance between the forward end of the load-carrying body and the draw bar these two structural elements of the trailer are capable of being adjusted to considerable greater degrees of angularity than heretofore. Moreover the load-carrying body is capable of being tilted forwardly as well as rearwardly. The pivotal connection of the draw bar and its associated radius rods to the axle and the depressed character of the forward section of the draw bar enables the draw bar to be connected to towing vehicles at considerable heights above the ground while maintaining the load-carrying body on the level and without distorting or compressing the spring mounting between the body and the axle.

Other features of the invention relate to the novel manner of adjustably supporting the front end of the load-carrying body upon the draw bar including the provision of a pivoted bar or link which by virtue of its pivotal connection economizes in the cost of manufacture and expedites the leveling adjustments.

Various other objects, advantages and meritorious features will become more fully apparent from the following specification, appended claims and accompanying drawings wherein:

Fig. 1 is a side elevation of a trailer structure embodying this invention illustrating in full and dotted lines two positions of the load-carrying body, Fig. 2 is a fragmentary view taken along line 2—2 of Fig. 1 illustrating one form of adjustable connection between the load-carrying body and the draw bar, Fig. 3 is a horizontal sectional view taken along line 3—3 of Fig. 2, Fig. 4 is a horizontal sectional view taken along line 4—4 of Fig. 1 illustrating the under-carriage assembly, Fig. 5 is a horizontal sectional view along line 5—5 of Fig. 4, Fig. 6 is a fragmentary view illustrating a modified form of adjustable connection between the load-carrying body and the draw bar, and Fig. 7 is a sectional view taken along line 7—7 of Fig. 6.

Referring to the drawings, the embodiment of the invention illustrated therein comprises a body 10, which may be of the open box type as shown, for carrying loads. The body 10 is preferably mounted upon a rectangular frame consisting of parallel side members 12, one of which is shown in Fig. 1, and parallel forward and rear cross members 14 and 16 respectively. The members may be channel-shaped metal bars as shown welded or otherwise securely joined together at their ends and of such lengths as to enclose an area substantially equal to the body 10. The frame is preferably resiliently supported upon an axle shaft 18 by spring means 20 of any desirable form which are herein shown as of the half-elliptic type. Two such springs are utilized, one between side members 12 of the frame and the axle. As shown, the body 10 is preferably mounted in balanced relation on the axle with fore and aft portions of the body extending equal distances on either side of the axle.

The axle 18 is preferably square in formation and carries a wheel 22 journaled on each end thereof. Two wheels are employed on the trailer, one of which is shown in Fig. 1. The axle may be strengthened by a tie rod 24 as shown in Fig. 4 having brackets 26—26 at each end thereof secured by U-shaped clamps or bolt members 28—28 to the axle. The U-shaped clamps encircle the axle and cooperate in the securement of radius rods to the axle as described hereinafter.

The towing means which is attached to the rear end of a motor vehicle comprises a single elongated tongue or draw bar 30 attached at its forward end by any suitable coupling member 32 to the vehicle and at its rear end directly to the axle 18. A novel form of attachment is utilized for securing the draw bar to the axle. Instead of a fixed connection a pivotal connection is used which allows the draw bar to swing in a vertical path relative to the axle. The draw bar is preferably of channel shaped formation throughout its extent as shown in Fig. 2. Correspondingly shaped end plates 34—34 are welded or otherwise secured to the sides of the draw bar at its rear end and as shown in Fig. 4, these plates extend rearwardly beyond the extremity of the draw bar in spaced parallel relation to one another. Brackets 36—36 of L-shape formation are secured to the axle by any suitable means such as the U-shaped clamps 38—38 similar to the clamps 28—28. These brackets are mounted on the forward side of the axle and arranged to overlap the end plates 34—34 either on the inside as shown or on the outside. Both the plates and brackets are provided with holes which when brought into registration are capable of receiving a pivot pin 40. The latter extends parallel to the axis of the axle and normally horizontally. By virtue of this form of attachment the axle is pulled directly by the draw bar and the latter is capable of swinging movement relative to the axle.

To prevent whip or side sway of the trailer when towed at a fast rate of speed, two radius rods 42—42 are employed. The forward ends of these rods are secured to a common bracket 44 which may be bolted or welded to the base of the channel of the draw bar. The two radius rods extend rearwardly divergingly away from one another and are attached to the axle at widely spaced apart positions preferably adjacent to the wheels. To accommodate the diverging relationship of the two rods, the bracket 44 is preferably provided with two upright sections 46—46 disposed at an angle to one another as shown in Fig. 4. The radius rods are jointly swingable with the draw bar by having their rear ends pivotally connected to the axle. This is preferably accomplished by providing brackets 48—48 which are secured to the axle by the U-shaped clamps 28—28 previously mentioned. These brackets are each provided with outwardly turned section which extends in alignment with the radius rod to which it is attached. The rear ends of each radius rod is shaped in any suitable way for pivotal connection to its respective bracket, such as by threading one end of a cylindrical member 50 on the end of the rod and providing a slot in the member which opens out of the other end thereof and is of a size to receive the forwardly bent section of the bracket. The slotted end of each member 50 is apertured as is the section of the bracket received therein and the two are pivotally coupled together by a pin 52. The axes of the pins 52—52 lie substantially in the same plane as the axis of the pivot pin 40 but since they are disposed normal to the rod for which they serve as the pivotal connection, they extend at an angle to one another and the pivot pin.

The load-carrying body 10 and the draw bar 30 are capable of being adjusted to various inclined positions with respect to one another in order to carry the load at the most convenient angle.

Usually it is desirable to tow the trailer with the body 10 on the level but the latter may if desired be inclined backwardly or forwardly while being towed or during the loading or unloading operations. The pivotal connection of the draw bar to the axle permits the forward end of the draw bar to be raised or lowered without turning the axle. The draft fixtures on motor vehicles to which the coupling member 32 is attached are at various heights from the ground. As a result of a novel adjusting means between the body 10 and the draw bar 30 it is possible to set the body at a horizontal position and maintain it in this level condition regardless of the height of the point of attachment of the draw bar or reach on the towing vehicle.

Referring to Figs. 1 to 3, there is provided at the forward end of the body 10 an adjustable connecting member in the form of a rigid bar or link 54. One end of this link is pivotally connected to the draw bar about a transversely extending horizontal axis. This is preferably accomplished by providing a pair of parallel vertically extending plate members 56—56 welded at their lower ends to the base of the draw bar as shown in Fig. 2. These plates are spaced apart sufficiently to receive one end of the link member and these elements are apertured to receive a headed pin 58 for pivotally coupling the link member to the plates.

When raised above its pivotal connection the link 54 extends closely adjacent to the front end of the body 10. The latter is provided with means at the center of the front cross bar 14 for disconnectible attachment to the link. To provide a plurality of points of attachment the link is provided with a series of longitudinally spaced apertures 60 along its length. The link is capable of being received between two angle bracket members 62—62 supported on the front cross member 14 as shown in Figs. 2 and 3 through which a locking element or bolt 64 is slidable. As is evident, the link member 54 is receivable between the bracket members and by swinging the draw bar relative to the body or by inclining the body with respect to the draw bar if the latter is stationary it is possible to select any one of the plurality of apertures 60 through which the locking rod 64 may be inserted. When inserted the link will hold the body in any adjusted position relative to the draw bar. Any suitable means may be provided for holding the locking bolt 64 in operating position. One end of the bolt may be bent as shown and to the other end a tensioned spring 66 may be detachably connected. The latter holds the bolt in place against withdrawal. When it is desired to re-adjust the angular relation between the draw bar and the body, the spring is uncoupled and the bolt 64 withdrawn as indicated by its dotted position in Fig. 2.

The adjustable supporting link 54 illustrated herein is of relatively short length. For maximum backward tilting of the body a longer link may be employed. As shown in Fig. 1, an alternative link 68 shown in dotted lines may be used which is approximately twice the length of link 54 and extends to a height substantially equal to the height of the upper end of the body 10 when the latter is disposed in level position. Like the link 54, the longer link is pivoted at its lower end to the draw bar and is apertured at spaced intervals throughout its length to receive a locking bolt similar to bolt 64.

In place of the spring means 66 for holding the lock bolt in adjusted position, the type of retaining means illustrated in Figs. 6 and 7 may be used. On one of the angle brackets 62 a clip formed of two springable members 70—70 may be used. This clip is disposed offset to the bolt receiving aperture in the bracket upon which it is mounted and in position to receive the bent handle end of the bolt 64 when the latter is turned down. In this position the bolt is held against sliding movement in the apertures of the brackets and the link member but when swung out of the clip to a position as that shown in dotted lines in Fig. 7 it may be easily slid into and out of the apertures of the brackets and link members.

By pivotally connecting the rigid link members 54 or 68 to the draw bar rather than having them fixed thereto it is possible to use inexpensive materials for forming the adjustable support. If fixed to the draw bar any member corresponding to the links 54 and 68 would have to be curved throughout its extent having at its center of curvature either the axle or the axis of the draw bar pivot pin 40. The series of bolt receiving holes in such a member would likewise extend in a curve. However, the pivotal mounting enables the use of a single straight link or bar of inexpensive construction and by swinging it about its horizontal pivotal axis on the draw bar member it is possible to bring any one of the apertures 60 into registration with the aligned apertures in the brackets 62—62 carried on the body member 10.

In many instances the draft fixture on the end of the towing vehicle to which the coupling member 32 is attached is at a considerable height above the ground. In order that the draw bar 30 may be attached thereto and yet permit adjustment of the body to a horizontal level, the draw bar is shaped in a novel manner to depress the forward end section thereof below the rear section. This is preferably accomplished by the expedient of providing a jogged portion intermediate the ends of the draw bar and aft of the forward end of the body 10. Such a jogged or bent portion is indicated at 72. In the illustrated embodiment of the invention this disposes the front section of the draw bar at a lower level than the rear section thereof but parallel thereto. The front section to which the supporting adjustable links 54 or 68 are attached is depressed further below the front end of the body 10 than if the draw bar were perfectly straight and greater clearance is provided between the draw bar and the front end of the body. As a result the draw bar may be raised to an inclined position such as indicated in dotted outline in Fig. 1 without disturbing the horizontal position of the load-carrying body. The draft fixture on the end of the towing vehicle may be as high as 36 inches from the ground and yet the trailer may be towed thereby with the body on the level. The depressed character of the front section of the draw bar also enables the body 10 to be inclined downwardly at the front end if it is desired to handle a load at that angle.

The pivotal connection of the draw bar and associated radius rods directly on the axle enables the angular adjustment of the load-carrying body relative to the draw bar to be accomplished without unnaturally distorting the springs 20. If a rigid connection was used and the forward end of the draw bar attached to a high point on a towing vehicle, the leveling adjustment of the load-carrying body 10 would compress the forward end sections of the springs 20 and widen or expand the rear sections of the springs and as a result provide an unsatisfactory spring support which would be especially dangerous at high speeds of travel. The pivotal connection of the draw bar and the radius rods to the axle eliminates this hazard and assures a properly spring supported body for the load regardless of the inclination of either the draw bar or the body to the horizontal.

Although the brackets 36—36 and 48—48 may be directly attached to the axle, it is preferred to fixedly secure these elements upon a metal strap 74 running the greater portion of the length of the axle. By welding these brackets to the metal strap they are held at fixed points along the length of the axle and moreover form a sub-assembly including the draw bar 30, radius rods 42—42 and the metal strap 74 which may be separately manufactured and quickly attached to the axle as a unit. The central portion of the tie rod 24 is preferably received in an opening drilled in a metal block 76. The latter is preferably welded as shown to a metal strap 78 of relatively short length which extends under the U-bolts 38—38. The two metal straps 74 and 78 are secured to the opposite sides of the axle by the U-bolts 28—28. Thus the sub-assembly previously mentioned and the tie rod assembly including the block 76 and strap 78 may be separately fabricated and readily installed upon conventional axles without altering the construction of the latter. The metal straps also serve to strengthen the axle in use.

What I claim is:

1. A trailer comprising, in combination, a single axle having a ground engaging wheel journaled at each end thereof, a load carrying body having its middle portion spring supported directly on said axle, a draw bar having its rear end pivotally connected to the middle portion of the axle about a horizontal axis and extending forwardly therefrom beyond the front end of the body and provided on its forward end with means for attachment to a towing vehicle, said draw bar being provided with a jog intermediate its ends below the body so as to dispose the front section of the draw bar at a lower level than the rear section thereof, a rigid link having one end pivotally connected to said depressed forward section of the draw bar about a horizontal axis and having such a length that when swung to a raised position it will extend above the higher rear section of the draw bar and closely adjacent to the front end of the body, said link having a series of apertures spaced longitudinally therealong and extending from a point below the level of the rear section of the draw bar to the upper end of the link, retractable bolt means carried on the front end of the body adapted to enter any one of said apertures and adjustably lock the body to the link to thereby support the body at various inclinations relative to the draw bar, a pair of radius rods having their forward ends rigidly secured to the depressed section of the draw bar and extending divergingly rearwardly and upwardly to points adjacent to the ends of the axle, and means pivotally connecting the rear ends of the radius rods to the axle adjacent to the ends thereof about horizontal axes and in a plane common to the axis of the pivotal connection between the draw bar and the axle whereby the draw bar and the radius rods may be swung together in a vertical path relative to the axle.

2. A trailer comprising, in combination, a single axle having a ground engaging wheel journaled at each end thereof, a load carrying body frame having its middle portion spring supported directly on said axle, a draw bar having its rear end pivotally connected to the middle portion of the axle about a horizontal axis and extending forwardly therefrom beyond the front end of the body frame and provided on its forward end with means for attachment to a towing vehicle, said draw bar being provided with a jog intermediate its ends below the body frame so as to dispose the front section of the draw bar at a lower level than the rear section thereof and substantially parallel thereto, and a non-yielding adjustable connection between the depressed forward section of the draw bar and the front end of the body frame for holding the body frame in tilted relation to the draw bar, said adjustable connection including means for holding the front end of the body frame at a position intermediate the respective planes of the front and rear sections of the draw bar.

HARVEY J. LIVERNOIS.

REFERENCES CITED

The following references are of record in the file of this patent:

UNITED STATES PATENTS

| Number | Name | Date |
| --- | --- | --- |
| 1,265,705 | Litchfield | May 7, 1918 |
| 1,548,987 | Drane | Aug. 11, 1925 |
| 1,598,084 | Kingham et al. | Aug. 31, 1926 |
| 1,941,400 | Johnson | Dec. 26, 1933 |
| 2,207,812 | McCellan | July 16, 1940 |
| 2,332,326 | Lex | Oct. 19, 1943 |

FOREIGN PATENTS

| Number | Country | Date |
| --- | --- | --- |
| 224,641 | Great Britain | Nov. 20, 1924 |
| 239,332 | Great Britain | Sept. 10, 1925 |